Oct. 30, 1951    C. F. KRAMER    2,573,028
AUTOMOBILE DOOR HANDLE
Filed July 22, 1946    3 Sheets-Sheet 1
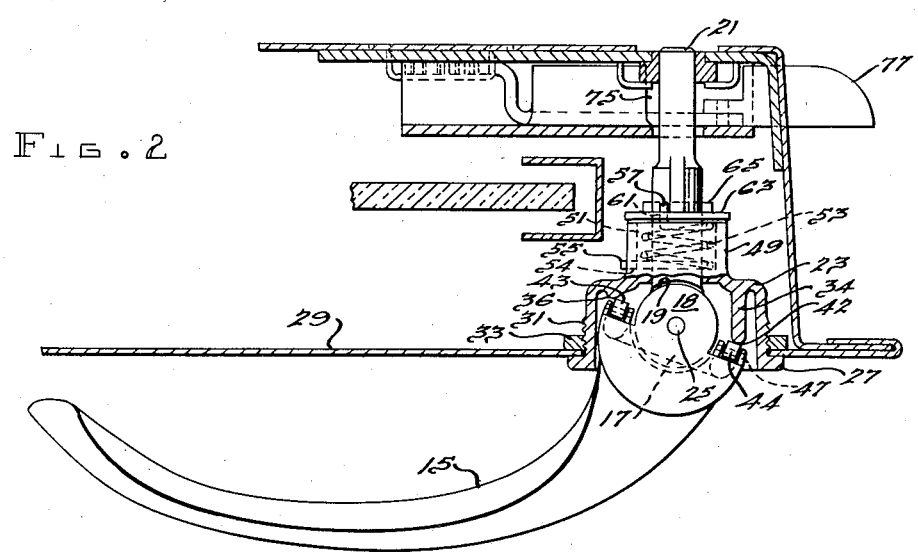
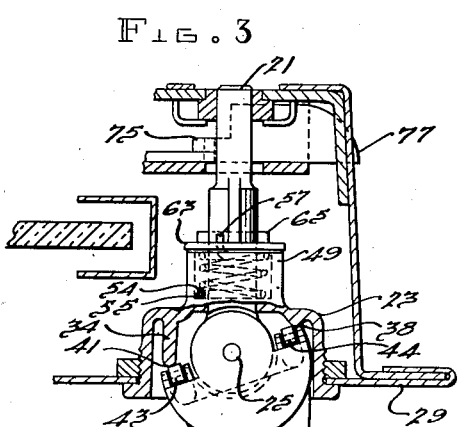
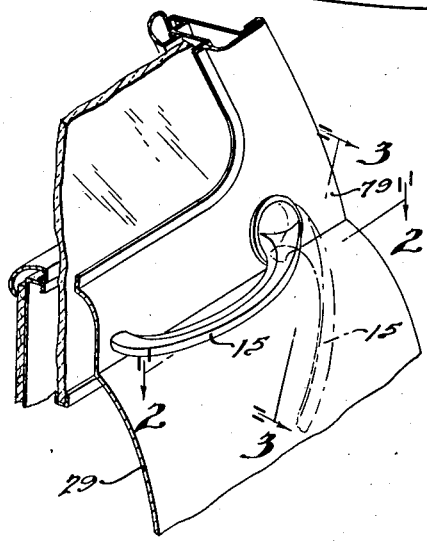
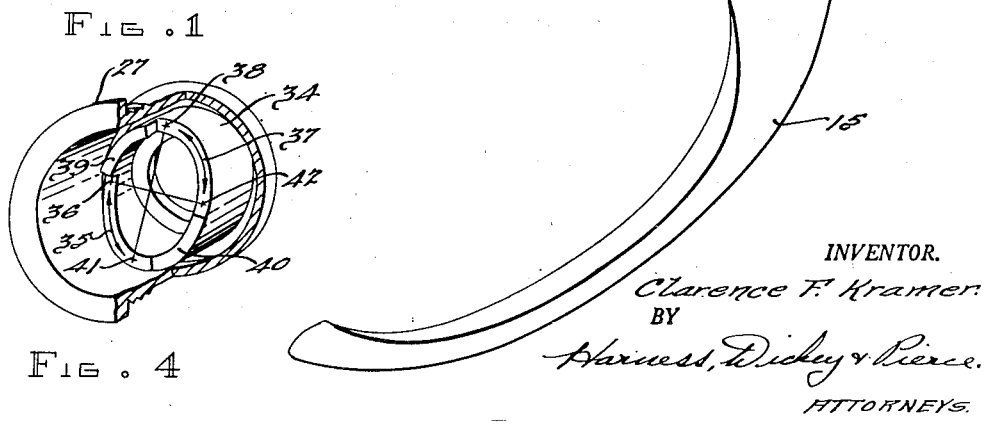
INVENTOR.
Clarence F. Kramer
BY
Harness, Dickey & Pierce.
ATTORNEYS.

Oct. 30, 1951      C. F. KRAMER      2,573,028
AUTOMOBILE DOOR HANDLE
Filed July 22, 1946      3 Sheets-Sheet 2
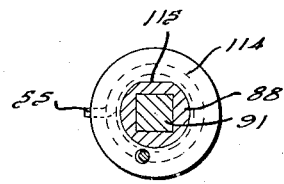
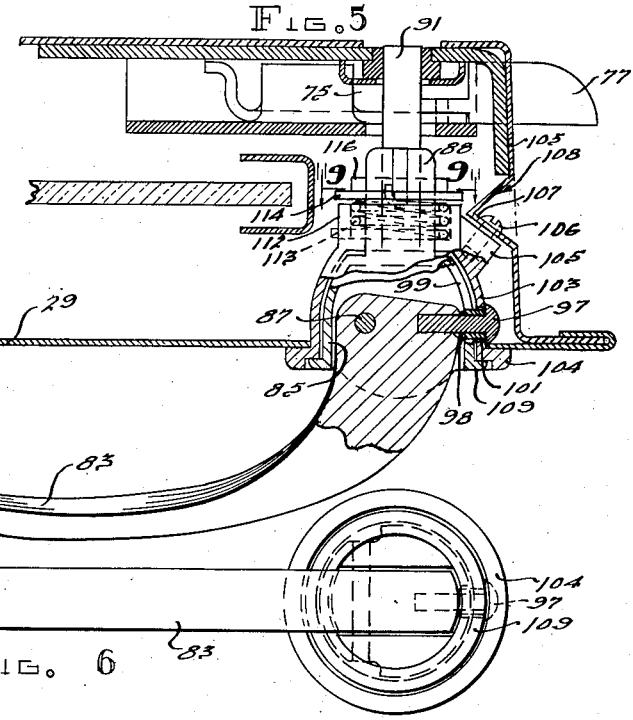
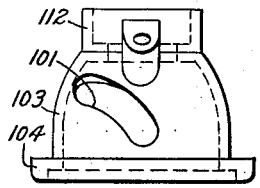
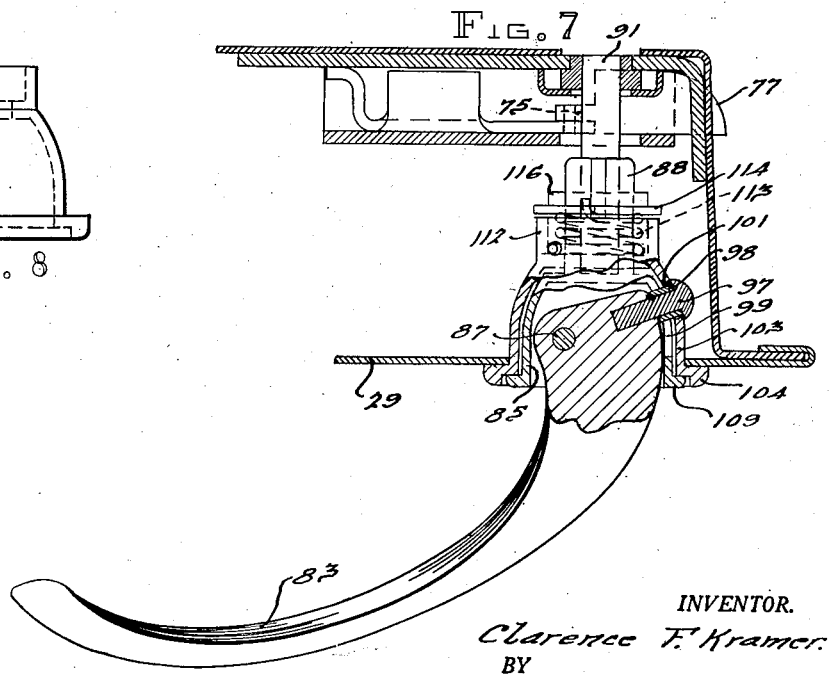
INVENTOR.
Clarence F. Kramer.
BY
Harness, Dickey & Pierce.
ATTORNEYS.

Oct. 30, 1951     C. F. KRAMER     2,573,028
AUTOMOBILE DOOR HANDLE
Filed July 22, 1946     3 Sheets-Sheet 3
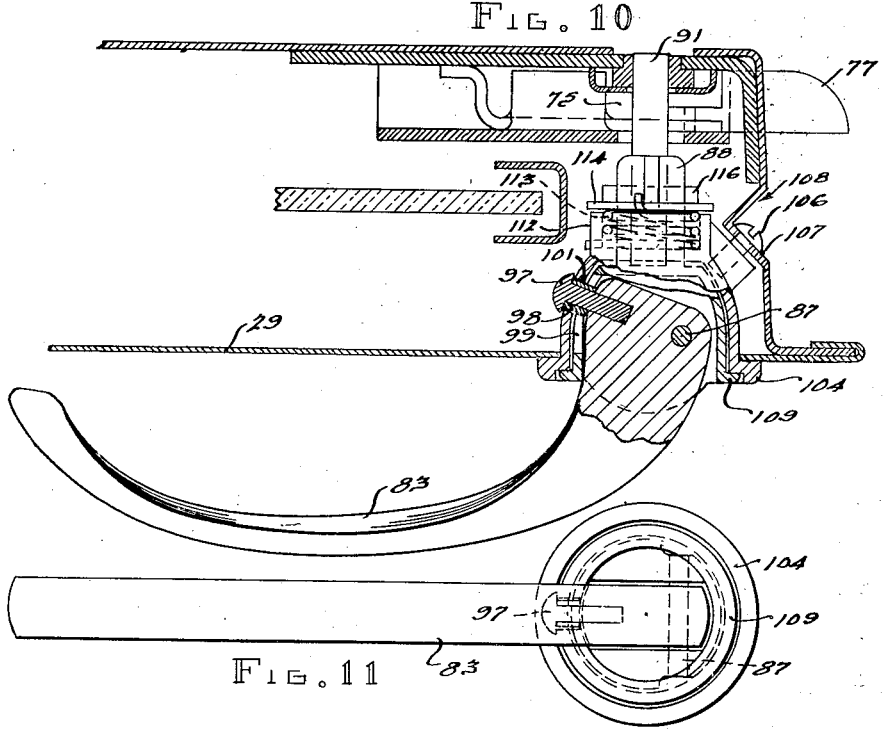
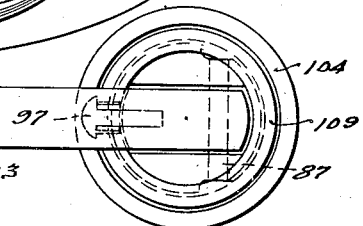
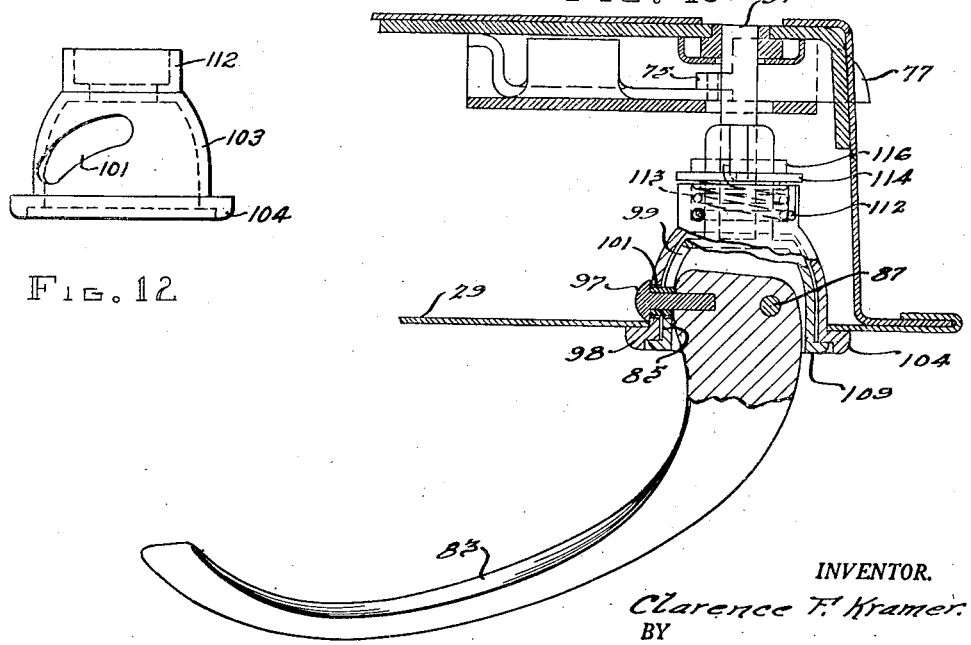
INVENTOR.
Clarence F. Kramer.
BY
Harness, Dickey & Pierce
ATTORNEYS.

Patented Oct. 30, 1951

2,573,028

UNITED STATES PATENT OFFICE 2,573,028

AUTOMOBILE DOOR HANDLE

Clarence F. Kramer, Birmingham, Mich.

Application July 22, 1946, Serial No. 685,480

2 Claims. (Cl. 292—356)

1

This invention relates to door handles, and more particularly to door handles for automobiles.

In the present type automobile door handle in use, the door handle end turns in a plane 90° to the handle shaft axis and this makes it necessary to locate the handle on a sufficiently high point of the body panel contour to provide clearance for the handle end as it rotates. With the elimination of exposed running boards on the present motor vehicles, the high point of the body side panel contour is very near the widest point of the car and when the door handle is mounted on this surface it produces a very hazardous extension which has, on occasion, hooked into the clothing of pedestrians with serious results when the car is being driven near curbs or through crowded streets.

According to the present invention, this difficulty is eliminated by locating the handle on a surface of the body side panel inwardly from the high point of the body contour where the handle end has better protection and then devising a handle that will turn outwardly away from any high point on the contour of the panel when the handle is pressed downwardly to open the door.

It is, therefore, an object of this invention to provide a door handle which can be located on the surface of an automobile side panel inwardly from the high point of the side panel and which is capable of swinging outwardly to clear the body panel when the handle is operated in such a manner to open the door.

It is a further object of this invention to provide a control swivel for a door handle which will swing the door handle end outwardly to clear a high portion of the body panel when opening the automobile door.

It is another object of this invention to provide a control swivel for a door handle which, when the door handle is released after being actuated, will cause the door handle end to travel over the high part of the body panel and return to its normal position adjacent the low or depressed part of the body panel.

It is a further object of this invention to provide a door handle of the type designated which can be employed with a conventional latch bolt retracting mechanism as used on conventional automobile doors.

These and other objects of my invention will become apparent from the following detailed description taken in conjunction with the accompanying drawings in which:

Figure 1 is a perspective view of an automobile door having a lock constructed according

2 to one form of the invention and showing the handle in the locked position in full lines and in the unlocked position in broken lines;

Figure 2 is a sectional view taken substantially along line 2—2 of Figure 1 showing the handle in the locked position;

Figure 3 is a sectional view taken substantially along line 3—3 of Figure 1 with the parts in the unlocked position;

Figure 4 is a cutaway view of the door handle housing and control cam used in the embodiment shown in Figure 2;

Figure 5 is a sectional view similar to Figure 2 showing a lock wherein a slot-type control swivel is used;

Figure 6 is a side view of the exterior of the handle assembly shown in Figure 5;

Figure 7 is a sectional view similar to Figure 3 showing the lock of Figure 5 with the parts in the unlocked position;

Figure 8 is an end view of the handle housing showing the cam slot used in this embodiment of the invention;

Figure 9 is a cross sectional view taken substantially along line 9—9 of Figure 5;

Figure 10 is a sectional view similar to Figure 2 showing another embodiment of the invention, with the handle in the locked position;

Figure 11 is a side view of the handle projected from Figure 10;

Figure 12 is a side view of the handle housing showing the cam slot;

Figure 13 is a sectional view similar to Figure 3 and showing the lock of Figure 9 with the parts in the unlocked position.

Referring to Figure 2, it will be seen that a door handle 15 is recessed as at 17 and has ears 18 to receive the circular end 19 of a rectangularly shaped lock control shaft 21. These ears are pivotally connected to shaft 21 by means of a pin 25. A housing 23 in which the shaft turns is provided with a shoulder 27 which fits against the outside surface of the body panel 29 and this housing is threaded inwardly of the body panel as at 31 to receive a nut 33 which, when screwed against the body panel, holds the housing rigidly in place. As best shown by Figure 4, the housing 23 has an integral, sleeve-like cam 34 provided with two inclined cam surfaces 35 and 37 on the end thereof adjacent handle 15. Two stops 39 and 40 are provided to separate the two cam surfaces from each other. Cam surface 35 is inclined with its low point 36 adjacent stop 39 and inclined outwardly to a high point 41 adjacent stop 40. Cam surface 37 is inclined with its low point 38 adjacent stop 39 and inclined outwardly to a high point 42 adjacent stop 40. Rollers 43 and 44 are pivotally mounted on handle 15 on opposite sides of the circular end 19 of control shaft 21 and roller 43 moves along cam surface 35 while roller 44 moves along cam surface 37.

The rear portion of housing 23, indicated at 49, is recessed to provide a housing 51 for a spring 53. A hole 54 is drilled through one side of this rear portion 49 and one end 55 of spring 53 is inserted in this hole 54. The other end of the spring indicated at 57 fits in a hole 61 drilled through a washer 63 inwardly of housing 23 and which is keyed or otherwise fixed to the shaft so as to turn therewith. A pin 65 extending through the shaft holds washer 63 in place against the rear portion 49 of the housing 23.

The inner end of control shaft 21 extends into a conventional lock bolt mechanism 75 where it engages and operates a standard door locking member 77.

In operation, when door handle 15, which is located in a low portion 79 of door panel 29, is in the normal closed position adjacent the body panel, roller 44 is in contact with high point 42 on cam surface 37 of cam 34 while roller 43 is in contact with the low portion 36 of cam surface 35. This causes the door handle end to be in an inward position adjacent the outer panel 29. When the door handle 15 is pressed downwardly, roller 43 moves from low point 36 on cam surface 35 to the high point 41 at the same time roller 44 moves from high point 42 on cam surface 37 to low point 38 thereon, thus causing the handle end to swing outwardly. This can readily be seen by referring to Figure 3 which shows the door handle swung outwardly due to the camming action of the cam 34. When the door handle is pushed downwardly in this manner, the control shaft 21 turns washer 63 which, having one end of spring 53 secured thereto, causes spring 53 to be turned so as to be in a wound condition. At the same time, control shaft 21 causes the latch 77 to be moved inwardly in the conventional manner, thus unlocking the door. When the handle is released, the spring 53, being in a wound condition, unwinds itself and causes the control shaft to be turned back to its normal position, thus allowing the latch 77 to move outwardly to its normal position and at the same time causing the rollers to move back along the cam surfaces to their original positions. When the rollers move back to their original positions, they cause the handle end to move inwardly over the high portion of the body panel 29 and thence back to its normal position adjacent the low part of the door panel 29.

Thus, it can be seen that by merely pressing down on the door handle the cam action automatically pivots and swings the door handle end outwardly over any point of high contour over which it must pass. The cam surfaces can, of course, be inclined at varying pitches depending upon how far it is necessary to swing the door handle end outwardly. The further the door handle end must be swung, the greater must be the angle of inclination of cam surface. This, however, is something which must be determined for each individual automobile upon which it is used.

A modified type swivel control for a door handle is shown in Figures 5, 6, 7 and 8. The door handle is indicated at 83 and is pivotally mounted in a movable socket member 85 by means of a cross pin 87 so that, when handle 83 is turned, socket member 85 is likewise turned. At its inner end, the socket member 85 has a square socket extension 88 which receives a square end portion of a control shaft 91 which extends into the conventional door latch mechanism as described previously. The handle 83 carries a pin 97 and roller 98 projecting transversely through an axial slot 99 in socket member 85 and also into a groove 101 in a fixed housing 103. It will be noted that the groove 101 is directed spirally about the periphery of housing 103 so that if the handle 83 is turned or pressed downwardly, for instance, the pin 97, in following groove 101 in housing 103, will have to move inwardly in order to follow the contour of the groove. The slot 99 in socket member 85 merely allows inward and outward movement of pin 97 when moving through groove 101.

The housing 103 has an annular flange 104 abutting the outer side of the panel 29, and inwardly of the panel the housing has a flat faced boss 105 disposed next to the edge face of the door. This boss is secured by means of a screw 106 to one wall 107 of a V-shaped portion 108 in such edge face. This means of fastening the housing in place permits ready assembly and disassembly while at the same time it prevents removal of the housing when the door is in a closed, locked position. The socket member 85 which turns in the housing 103 also has a marginal flange 109 which normally engages the flange 104 on the housing so as to limit inward movement of the socket member. At its inner end the housing 103 similarly to the construction previously described, has a tubular extension 112 which houses a coil spring 113 encircling the extension 88 on the socket member 85. This spring has one end anchored to the housing in the manner described previously in connection with Figure 3 while the other end of the spring is connected to a washer 114 disposed on the socket extension. Such washer and socket extensions are interlocked so as to turn together and this interlocking may be effected by providing flat sides 115 on the socket extension and by having the opening in the washer shaped accordingly to fit the extension. A pin 116 extending through the socket extension and shaft holds the washer in position.

Figures 10, 11, 12 and 13 show a further embodiment of the invention. This modification is the same as the embodiment shown in Figures 5–8 except that the slot 99 in socket member 85 and groove 101 in fixed housing 103 are provided on the opposite sides of their respective members from the manner shown in Figures 5–8. This necessitates changing the position of door handle pivot pin 87 to alter the pivot motion of handle 83; but otherwise this embodiment is identical with that shown in Figures 5–8.

In operation of both of these embodiments, when door handle 83 is pressed downwardly it pivots about pin 87, causing the control shaft 91 to rotate and actuate the door latch mechanism 93 and thus move the door latch member 77 inwardly so as to release it. When control shaft 91 moves it causes movement of washer 125 which, because the spring 113 has one end inserted in a hole in the washer, causes the spring to be rotated so that it is in a wound condition. As the handle moves downwardly, pin 97, following the spiral groove 101 in the stationary housing 103, rotates the handle end outwardly away from the high point of the body panel.

The angle at which the spiral groove runs within the stationary housing 103 depends again upon the amount of outward movement necessary to clear the high body portion of the panel. This again depends upon the particular type of body contour for which the handle is adapted to be used.

While I have described several embodiments of my invention, it is to be understood that I do not wish to be restricted thereto, and that I intend to cover all modifications thereof which would be apparent to one skilled in the art and which come within the spirit and scope of the appended claims.

I claim:

1. In a door handle operating mechanism, stationary housing mounted in a door, a rotatable socket member within said housing, a door handle pivotally connected to said socket member, a lock retracting mechanism mounted inwardly of said handle, a control shaft having one end thereof connected to said socket member and the other end thereof engaging and adapted to operate said lock retracting mechanism, said housing having a groove directed spirally about its periphery, and said socket member having slot means in spaced relation to said housing groove, and connection means carried by said handle and passing through said socket member slot means and through said housing groove whereby when said handle is manually operated said connection means will follow said housing groove and rotate the free end of said handle outwardly away from said body.

2. In a door handle operating mechanism, stationary housing mounted in a door, a rotatable socket member within said housing, a door handle pivotally connected to said socket member, a lock retracting mechanism mounted inwardly of said handle, a control shaft having one end thereof connected to said socket member and the other end thereof engaging and adapted to operate said lock retracting mechanism, said housing having a groove directed spirally about its periphery, and said socket member having slot means in spaced relation to said housing groove, and connection means carried by said handle and passing through said socket member slot means and through said housing groove whereby when said handle is manually operated said connection means will follow said housing groove and rotate the free end of said handle outwardly away from said body, and spring means to return said handle after it is manually operated to unlock the door.

CLARENCE F. KRAMER.

REFERENCES CITED

The following references are of record in the file of this patent:

UNITED STATES PATENTS

| Number | Name | Date |
|---|---|---|
| 1,684,499 | Mayer | Sept. 18, 1928 |
| 2,141,659 | Nehls | Dec. 27, 1933 |

FOREIGN PATENTS

| Number | Country | Date |
|---|---|---|
| 489,194 | Great Britain | July 21, 1938 |